US012773969B2

(12) United States Patent
Austin et al.

(10) Patent No.: US 12,773,969 B2
(45) Date of Patent: Oct. 27, 2026

(54) SMART VEHICLE WINDOW GLASS CLEANING SYSTEM

(71) Applicant: Toyota Motor Engineering & Manufacturing North America, Inc., Plano, TX (US)

(72) Inventors: Benjamin Piya Austin, Saline, WI (US); Rebecca L Kirschweng, Whitmore Lake, MI (US); George M Evans, Ann Arbor, MI (US); Philip J Babian, Canton, MI (US); William Patrick Garrett, Plymouth, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 651 days.

(21) Appl. No.: 18/176,576

(22) Filed: Mar. 1, 2023

(65) Prior Publication Data

US 2024/0294144 A1 Sep. 5, 2024

(51) Int. Cl.

| | |
|---|---|
| ***B60S 1/48*** | (2006.01) |
| ***B60S 1/04*** | (2006.01) |
| ***B60S 1/08*** | (2006.01) |
| ***B60S 1/52*** | (2006.01) |

(52) U.S. Cl.

CPC ............ *B60S 1/481* (2013.01); *B60S 1/0466* (2013.01); *B60S 1/0818* (2013.01); *B60S 1/522* (2013.01)

(58) Field of Classification Search

CPC ...... B60S 1/481; B60S 1/0466; B60S 1/0818; B60S 1/522

See application file for complete search history.

(56) References Cited

U.S. PATENT DOCUMENTS

| | | | | |
|---|---|---|---|---|
| 2014/0034084 | A1 | 2/2014 | Ryu et al. | |
| 2018/0201229 | A1 * | 7/2018 | Singer | B08B 1/16 |
| 2018/0266834 | A1 * | 9/2018 | Cronin | B60W 50/082 |

FOREIGN PATENT DOCUMENTS

| | | | | | |
|---|---|---|---|---|---|
| CN | 102134950 | A | | 7/2011 | |
| CN | 204548029 | U | | 8/2015 | |
| CN | 107650633 | A | * | 2/2018 | E05F 15/689 |
| DE | 19827005 | A1 | | 12/1999 | |
| KR | 101878118 | B1 | * | 7/2018 | B60J 3/002 |
| KR | 20200128282 | A | | 11/2020 | |

(Continued)

OTHER PUBLICATIONS

M. Kyriakidis et al., “A Human Factors Perspective on Automated Driving”, Theoretical Issues in Ergonomics Science, Mar. 8, 2017, 39 pages.

(Continued)

*Primary Examiner* — Kito R Robinson
*Assistant Examiner* — Erin Marie Hartmann
(74) *Attorney, Agent, or Firm* — Jordan IP Law, LLC

(57) ABSTRACT

One or more vehicles, vehicle systems, computer-implemented methods, and computer program products to enhance the situational competency and/or the safe operation of a vehicle by automatically causing a cleaning sequence of one or more movable vehicle window glass based on window glass cleanliness analysis and a determination that the vehicle window glass is unclean.

17 Claims, 8 Drawing Sheets

(56) References Cited

FOREIGN PATENT DOCUMENTS

WO WO-2020006154 A2 * 1/2020 ......... G02B 27/0093

OTHER PUBLICATIONS

Louay Saleh et al, "Shared Steering Control Between a Driver and an Automation: Stability in the Presence of Driver Behavior Uncertainty", IEEE Transactions on Intelligent Transportation Systems, Jun. 2013 , , 10 pages, vol. 14.

Darren Quick, "Window walking Windoro robot scrubs windows clean," Robotics, found at www.newatlas.com/windoro-window-cleaning-robot/16436/, Sep. 22, 2010, 10 pages.

SC Johnson, "Frequently Asked Questions—Windex®",www.windex.com.au/en-au/inspiration/more-about-windex/faq, 3 pages.

* cited by examiner

SMART VEHICLE WINDOW GLASS CLEANING SYSTEM

TECHNICAL FIELD

One or more embodiments relate generally to vehicles, vehicle systems, computer-implemented methods, and computer program products to enhance the situational competency and/or the safe operation of a vehicle by automatically causing a cleaning sequence of vehicle window glass based on window glass cleanliness analysis and a determination that the vehicle window glass is unclean.

BACKGROUND

Dirty vehicle windows, particularly windows that lack a windshield wiper, make it difficult for the driver to see, and thus, present a safety hazard to vehicle driver and vehicle. Vehicle drivers often don't have the time or ability to manually clean the windows (interior or exterior), especially during active operation of the vehicle. Traditional vehicle systems for cleaning windows, such as nozzles and wipers, create aerodynamic drag during operation of the vehicle.

BRIEF SUMMARY

Vehicles, vehicle systems, computer-implemented methods, and computer program products to enhance safe operation of a vehicle by automatically initiating a cleaning sequence of vehicle window glass, even when the vehicle is being driven by a driver and/or remote operator. In an example embodiment, the vehicle system includes a window glass cleaning apparatus arranged in an internal space defined by vehicle panels (e.g., door panels, wall panels, roof panels, etc.) that support vehicle window glass. Location of the window glass cleaning apparatus in the internal space serves to attenuate aerodynamic drag during a cleaning sequence while the vehicle is being driven. In another example embodiment, the vehicle system includes a window apparatus arranged in an internal space of a vehicle roof that supports roof-mounted vehicle glass panels. In yet a further example embodiment, the vehicle system includes a window glass cleaning apparatus arranged in an internal space defined by a vehicle rear wall (that supports rear vehicle window glass.

The vehicle system is operable to execute window glass cleanliness analysis to determine cleanliness of vehicle window glass based on captured data, stored data, and wireless communication network data. The vehicle system is operable to cause, in response to the window glass cleanliness analysis and based on a determination that the vehicle window glass is unclean, a cleaning sequence of the vehicle window glass.

The vehicle system may also be implemented not only to clean movable vehicle window glass, but also vehicle window glass that is fixedly mounted. The vehicle system may also be implemented to clear the vehicle window glass of snow, sleet, etc. When any vehicle window glass is determined to be unclean, the cleaning sequence may not be initiated when a detected ambient temperature of the ambient environment in which the vehicle is operating is below a threshold temperature value, or should ambient conditions in the external environment represent a safety hazard to a driver of the vehicle, vehicle occupants/passengers, and the vehicle itself. The driver can input settings (e.g., using a calendaring system) to selectively initiate when a cleaning sequence is necessary.

In accordance with one or more embodiments set forth, illustrated, and described herein, an example vehicle may comprise one or more of the following: one or more processors; and a non-transitory memory operatively coupled to the one or more processors comprising a set of instructions of computer-executable program code, which when executed by the one or more processors cause the vehicle to: execute window glass cleanliness analysis to determine cleanliness of vehicle window glass based on captured sensor data associated with a passenger cabin of the vehicle, stored data, and wireless communication network data; and cause, based on the window glass cleanliness analysis and a determination that the vehicle window glass is unclean, a cleaning sequence of the vehicle window glass.

In accordance with one or more embodiments set forth, illustrated, and described herein, an example vehicle may comprise one or more of the following: one or more processors; and a non-transitory memory operatively coupled to the one or more processors comprising a set of instructions of computer-executable program code, which when executed by the one or more processors cause the vehicle to: receive, from a vehicle system, captured sensor data associated with a passenger cabin of the vehicle; execute window glass cleanliness analysis to determine cleanliness of vehicle window glass based on the captured sensor data, stored data, and wireless communication network data; and cause, based on the window glass cleanliness analysis and a determination that the vehicle window glass is unclean, a cleaning sequence of the vehicle window glass.

In accordance with one or more embodiments set forth, illustrated, and described herein, an example vehicle system may comprise one or more of the following: a vehicle component having support panels that define an internal space; vehicle window glass supported by the support panels; a window glass cleaning system arranged in the internal space; one or more processors; and a non-transitory memory operatively coupled to the one or more processors comprising a set of instructions of computer-executable program code, which when executed by the one or more processors cause the vehicle system: execute window glass cleanliness analysis to determine cleanliness of the vehicle window glass based on captured sensor data associated with a passenger cabin of the vehicle, stored data, and wireless communication network data; and cause, based on the window glass cleanliness analysis and a determination that the vehicle window glass is unclean, the window glass cleaning system to perform a cleaning sequence of the vehicle window glass.

In accordance with one or more embodiments set forth, illustrated, and described herein, an example vehicle system may comprise one or more of the following: a vehicle component having support panels that define an internal space; vehicle window glass supported by the support panels; a window glass cleaning system arranged in the internal space; one or more processors; and a non-transitory memory operatively coupled to the one or more processors comprising a set of instructions of computer-executable program code, which when executed by the one or more processors cause the vehicle system: receive, from a vehicle system, captured sensor data associated with a passenger cabin of the vehicle; execute window glass cleanliness analysis to determine cleanliness of the vehicle window glass based on the captured sensor data, stored data, and wireless communication network data; and cause, based on the window glass cleanliness analysis and a determination that the vehicle window glass is unclean, the window glass cleaning system to perform a cleaning sequence of the vehicle window glass.

In accordance with one or more embodiments set forth, illustrated, and described herein, a computer program product comprising at least one non-transitory computer readable medium having with a set of instructions of computer-executable program code, which when executed by one or more processors of a computing device, cause the computing device to perform one or more of the following: execute window glass cleanliness analysis to determine cleanliness of a vehicle window glass based on captured sensor data associated with a passenger cabin of the vehicle, stored data, and wireless communication network data; and cause, based on the window glass cleanliness analysis and a determination that the vehicle window glass is unclean, a cleaning sequence of the vehicle window glass.

In accordance with one or more embodiments set forth, illustrated, and described herein, a computer program product comprising at least one non-transitory computer readable medium having with a set of instructions of computer-executable program code, which when executed by one or more processors of a computing device, cause the computing device to perform one or more of the following: receive, from a vehicle system, captured sensor data associated with a passenger cabin of the vehicle; execute window glass cleanliness analysis to determine cleanliness of a vehicle window glass based on the captured sensor data, stored data, and wireless communication network data; and cause, based on the window glass cleanliness analysis and a determination that the vehicle window glass is unclean, a cleaning sequence of the vehicle window glass.

In accordance with one or more embodiments, an example computer-implemented method may comprise one or more of the following: executing, by one or more processors of a computing device associated with a vehicle, window glass cleanliness analysis to determine cleanliness of vehicle window glass based on captured sensor data associated with a passenger cabin of the vehicle, stored data, and wireless communication network data; and causing, by the by one or more processors based on the window glass cleanliness analysis and a determination that the movable vehicle window glass is unclean, a cleaning sequence of the movable vehicle window glass.

In accordance with one or more embodiments, an example computer-implemented method may comprise one or more of the following: receiving, from a vehicle system, captured sensor data associated with a passenger cabin of the vehicle; executing, by one or more processors of a computing device associated with a vehicle, window glass cleanliness analysis to determine cleanliness of vehicle window glass based on the captured sensor data, stored data, and wireless communication network data; and causing, by the by one or more processors based on the window glass cleanliness analysis and a determination that the vehicle window glass is unclean, a cleaning sequence of the vehicle window glass.

In accordance with one or more embodiments, a window glass cleaning system is arranged in an internal space defined by support panels that support the vehicle window glass.

In accordance with one or more embodiments, the window glass cleaning apparatus comprises: a cleaning solution reservoir containing a cleaning solution; one or more cleaning members in fluidic communication with the cleaning solution reservoir, the one or more cleaning members being moveable between a stowed position and a deployed position to apply the cleaning solution to the surface during the cleaning sequence; and a drying member, moveable between a stowed position and a deployed position to dry/remove the cleaning solution from the surface during the cleaning sequence.

In accordance with one or more embodiments, the captured sensor data comprises one or more of image data relating to one or more images of the passenger cabin, captured biometric attribute data relating to one or more biometric attributes of a driver of the vehicle, and captured light intensity data relating to an amount of ambient/natural light that enters the passenger cabin through the movable vehicle window glass.

In accordance with one or more embodiments, the one or more cleaning members comprise a porous cleaning head that is mounted for rotation about an axis, the porous cleaning head having a width that corresponds to the width of the vehicle window glass.

In accordance with one or more embodiments, the set of instructions are executable by the one or more processors to cause the vehicle to cause, in response to the determination that the vehicle window glass is unclean, the cleaning solution reservoir to lubricate (e.g., wet) the one or more cleaning members.

In accordance with one or more embodiments, the set of instructions are executable by the one or more processors to cause the cleaning sequence by: moving the porous cleaning head to the deployed position in response to the lubrication (e.g., wetting) of the one or more cleaning members, and moving the vehicle window glass in a direction to engage and cause rotation of the porous cleaning head and thereby apply the cleaning solution on an interior surface of the vehicle window glass.

In accordance with one or more embodiments, the set of instructions are executable by the one or more processors to cause the cleaning sequence by: moving the porous cleaning head to the stowed position and the drying member to the deployed position in response to the applying the cleaning solution on the interior surface, and moving the movable vehicle window glass, in response to applying the cleaning solution on the interior surface, in a closing direction away from the window glass cleaning apparatus to engage the drying member and thereby dry the interior surface.

In accordance with one or more embodiments, wherein the set of instructions are executable by the one or more processors to cause the cleaning sequence by: moving the porous cleaning head to the deployed position in response to the lubrication (e.g., wetting) of the one or more cleaning members, and moving the movable vehicle window glass in a (opening) direction towards the porous cleaning head to engage and cause rotation of the porous cleaning head and thereby apply the cleaning solution on an exterior surface of the movable vehicle window glass.

In accordance with one or more embodiments, the set of instructions are executable by the one or more processors to cause the cleaning sequence by: moving the porous cleaning head to the stowed position and the drying member to the deployed position in response to the applying the cleaning solution on the exterior surface, and moving the movable vehicle window glass, in response to applying the cleaning solution on the interior surface, in an closing direction away from the window glass cleaning apparatus to engage the drying member and thereby dry the exterior surface.

In accordance with one or more embodiments, the set of instructions are executable by the one or more processors to cause the cleaning sequence by: moving the porous cleaning head to the deployed position in response to the lubrication (e.g., wetting) of the one or more cleaning members, and moving the vehicle window glass in a direction towards the porous cleaning head to engage and cause rotation of the porous cleaning head and thereby simultaneously apply the cleaning solution on an interior surface and an exterior surface of the vehicle window glass.

In accordance with one or more embodiments, the set of instructions are executable by the one or more processors to cause the cleaning sequence by: moving the porous cleaning head to the stowed position and the drying member to the deployed position in response to the applying the cleaning solution on the interior surface, and moving the vehicle window glass, in response to simultaneously applying the cleaning solution on the interior surface and the exterior surface, in a closing direction away from the window glass cleaning apparatus to engage the drying member and thereby simultaneously dry the interior surface and the exterior surface.

In accordance with one or more embodiments, the set of instructions are executable by the one or more processors to cause the cleaning sequence by: moving the porous cleaning head to the deployed position in response to the lubrication (e.g., wetting) of the one or more cleaning members, and moving the porous cleaning head in a cleaning direction to engage the vehicle window glass and thereby apply the cleaning solution on a surface (interior and/or exterior) of the vehicle window glass.

In accordance with one or more embodiments, the set of instructions are executable by the one or more processors to cause the cleaning sequence by: moving the porous cleaning head to the stowed position and the drying member to the deployed position in response to applying the cleaning solution on the surface, and moving the porous cleaning head in a drying direction to engage the drying member and thereby dry the surface (interior and/or exterior) of the vehicle window glass. In accordance with one or more embodiments, the detected one or more biometric attributes comprises one or more ocular characteristics of the driver.

In accordance with one or more embodiments, the one or more ocular characteristics comprises vertical palpebrae position.

In accordance with one or more embodiments, the one or more ocular characteristics comprises pupil dilation.

In accordance with one or more embodiments, the set of instructions are executable by the one or more processors to cause the vehicle to detect change in pupil size, which corresponds to a need to initiate a cleaning sequence.

In accordance with one or more embodiments, wherein the wireless communication network data comprises one or more of GPS data, weather data, crowdsourced weather data, and vehicle-to-vehicle (V2V) communication data.

In accordance with one or more embodiments, executing the window glass cleanliness analysis comprises executing a comparison of the captured biometric value to a predetermined threshold biometric value.

In accordance with one or more embodiments, executing the window glass cleanliness analysis comprises executing a comparison of the captured visual image data with the stored visual image data.

In accordance with one or more embodiments, executing the window glass cleanliness analysis comprises executing a comparison of the captured light intensity data with stored reference light intensity data.

BRIEF DESCRIPTION OF THE SEVERAL VIEWS OF THE DRAWINGS

The various advantages of the exemplary embodiments will become apparent to one skilled in the art by reading the following specification and appended claims, and by referencing the following drawings, in which:

DETAILED DESCRIPTION

Figure 1:
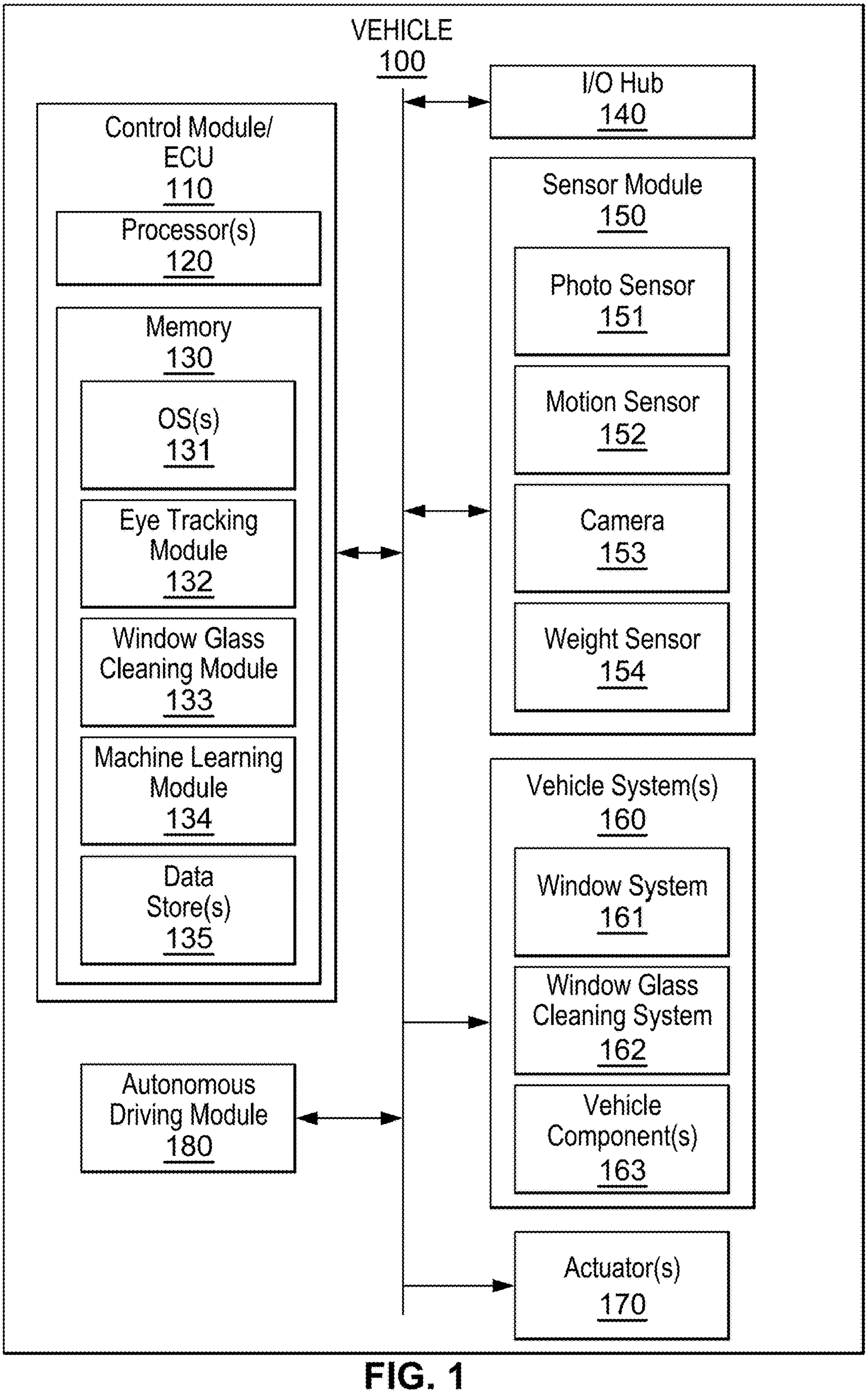
FIG. 1 illustrates an example of a vehicle, in accordance with one or more embodiments shown and described herein.
Figure 2:
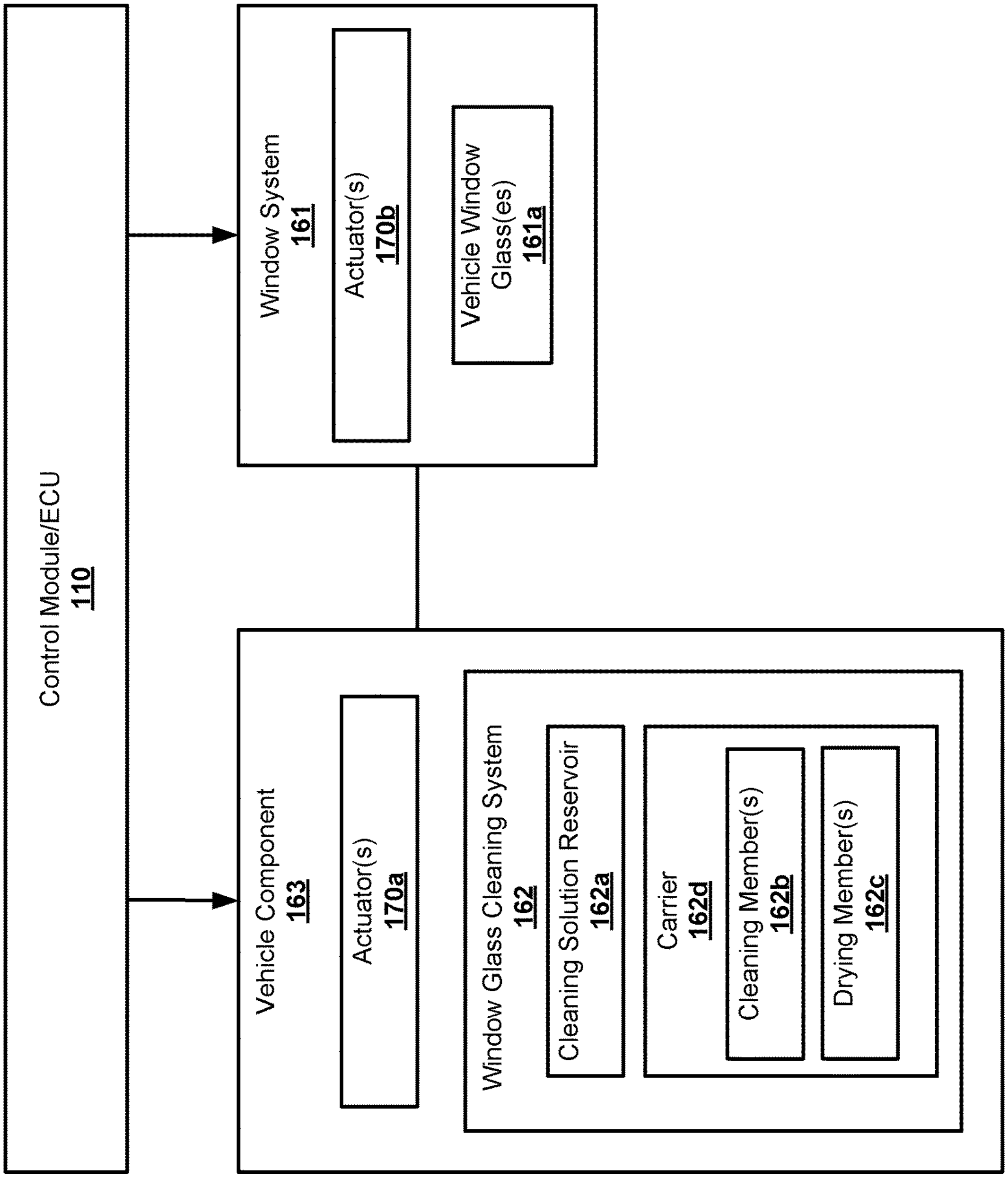
FIG. 2 illustrates a block diagram of the vehicle of FIG. 1.

Turning to the figures, in which FIG. 1 illustrates a vehicle 100, in accordance with one or more embodiments set forth, described, and/or illustrated herein. As described herein, a "vehicle" may be in reference to any form of motorized transport. In accordance with one or more embodiments, the vehicle 100 may comprise an automobile. Embodiments, however, are not limited thereto, and thus, the vehicle 100 may comprise a watercraft, an aircraft, or any other form of transport vehicle.

In accordance with one or more embodiments set forth, described, and/or illustrated herein, the vehicle 100 may comprise an electric vehicle (EV), a hybrid electric vehicle (HEV), a plug-in hybrid electric vehicle (PHEV), a battery electric vehicle (BEV), and a fuel cell electric vehicle (FCEV).

In accordance with one or more embodiments set forth, described, and/or illustrated herein, the vehicle 100 may comprise an autonomous vehicle. As described herein, an "autonomous vehicle" may comprise a vehicle that is configured to operate in an autonomous mode. As set forth, described, and/or illustrated herein, "autonomous mode" means that one or more computing systems are used to operate, and/or navigate, and/or maneuver the vehicle along a travel route with minimal or no input from a human driver.

In accordance with one or more embodiments set forth, described, and/or illustrated herein, the vehicle 100 may be configured to be selectively switched between an autonomous mode and a manual mode. Such switching may be implemented in any suitable manner (now known or later developed). As set forth, described, and/or illustrated herein, "manual mode" means that operation, and/or navigation, and/or maneuvering of the vehicle along a travel route, may, either in whole or in part, be performed by a human driver.

In accordance with one or more embodiments set forth, described, and/or illustrated herein, the vehicle 100 may comprise one or more operational elements, some of which may be a part of an autonomous driving system. Some of the possible operational elements of the vehicle 100 are shown in FIG. 1 and will now be described. It will be understood that it is not necessary for the vehicle 100 to have all the elements illustrated in FIG. 1 and/or described herein. The vehicle 100 may have any combination of the various elements illustrated in FIG. 1. Moreover, the vehicle 100 may have additional elements to those illustrated in FIG. 1.

In accordance with one or more embodiments set forth, described, and/or illustrated herein, the vehicle 100 may not include one or more of the elements shown in FIG. 1. Moreover, while the various operational elements are illustrated as being located within the vehicle 100, embodiments are not limited thereto, and thus, one or more of the operational elements may be located external to the vehicle 100, and even physically separated by large spatial distances.

In accordance with one or more embodiments set forth, described, and/or illustrated herein, the example vehicle 100 comprises a control module/electronic control unit (ECU) 110, an autonomous driving module 180, an I/O hub 140, a sensor module 150, one or more vehicle systems 160, and one or more actuators 170.

The control module/ECU 110 comprises one or more processors 120 and a non-transitory memory 130 operatively coupled to the one or more processors 120 comprising a set of instructions executable by the one or more processors 120 to cause the one or more processors 120 to execute one or more instructions to control various operational systems, subsystems, modules, and components of the vehicle 100. As described herein, "processor" means any component or group of components that are configured to execute any of the processes described herein or any form of instructions to carry out such processes or cause such processes to be performed. The one or more processors 120 may be implemented with one or more general-purpose and/or one or more special-purpose processors. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors 120 may comprise at least one hardware circuit (e.g., an integrated circuit) configured to carry out one or more instructions contained in program code. In embodiments in which there is a plurality of processors 120, such processors 120 may work independently from each other, or one or more processors 120 in the plurality may work in combination with each other. In one or more embodiments, the one or more processors 120 may be a host, main, or primary processor of the vehicle 100.

The non-transitory memory 130 comprises a set of instructions of computer-executable program code. The set of instructions are executable by the one or more processors 120 to cause execution of one or more operating systems 131 and one or more software applications of an eye tracking module 132 and a window glass cleaning module 133 that reside in the non-transitory memory 130.

The eye tracking module 132 provides eye tracking data, orientation data, and/or position data to the one or more processors 120.

The window glass cleaning module 133 is operatively connected to a window glass system 162 arranged in an internal space of a vehicle component 163 (e.g., a vehicle door, vehicle roof, vehicle back wall, etc.) that supports vehicle window glass 161*a*. The internal space being defined by vehicle panels that support the vehicle window glass 161*a* that is selectively movable, via an actuator 170*b*, between an open position to expose the vehicle passenger cabin to the ambient environment that is external to the vehicle 100, and a closed position to expose the vehicle passenger cabin to the ambient environment that is external to the vehicle 100. The window glass cleaning system 162 comprises a cleaning solution reservoir 162*a* containing a cleaning solution, one or more cleaning members 162*b* in fluidic communication with the cleaning solution reservoir, and one or more drying members 162*c*.

The one or more cleaning members 162*b* are operable for movement between a stowed position away from a surface of a corresponding movable vehicle window glass 161*a*, and a deployed position to engage the surface and thereby apply the cleaning solution thereto the surface. The one or more cleaning members 162*b* may comprise a porous cleaning head that is mounted on a carrier 162*d* for rotation about a rotational axis, the carrier 162*d* itself being pivotably movable via an actuator 170*a* about a pivot axis towards and away from the surface of the corresponding movable vehicle window glass 161*a*. Embodiments, however, are not limited thereto, and thus, this disclosure contemplates the one or more cleaning members 162*b* comprising any suitable architecture or structural configuration that falls within the spirit and scope of the principles of this disclosure and which facilitates or otherwise contributes to an optimization or transformation of the performance and functionality of the one or more embodiments.

In an embodiment that implements a single porous cleaning head, the single porous cleaning head has a width that corresponds to the width of the vehicle window glass 161*a*. In an embodiment that implements a plurality of porous cleaning heads that are aligned in a lateral row across the surface of the corresponding movable vehicle window glass 161*a*, the porous cleaning heads have a combined width that corresponds to the width of the vehicle window glass 161*a*.

The one or more drying members 162*c* are operable for movement between a stowed position away from the surface of a corresponding movable vehicle window glass 161*a*, and a deployed position to engage the surface and thereby dry/remove the cleaning solution therefrom. Each drying member in the one or more drying members 162*c* comprise a blade member that is operable to spread, push, or wipe the cleaning fluid on, across, or off the surface movable vehicle window glass 161*a*. The blade member is mounted on the carrier 162*d* that is caused to pivot towards and away from the surface of the corresponding movable vehicle window glass 161*a*. In accordance with one or more embodiments set forth, described, and/or illustrated herein, the porous cleaning head and the blade member may be mounted on different carriers. In an embodiment that implements a plurality of drying members 162*c* that are aligned in a lateral row across the surface of the corresponding movable vehicle window glass 161*a*, the drying members 162*c* have a combined width that corresponds to the width of the vehicle window glass 161*a*.

The window glass cleaning module 133 set forth, described, and/or illustrated herein may include artificial or computational intelligence elements, e.g., neural network, fuzzy logic, or other machine learning algorithms.

A machine learning (ML) module 134 may include one or more ML algorithms to train one or more machine learning models based on data and/or information resided in the memory 130. The ML algorithms may include one or more of a linear regression algorithm, a logical regression algorithm, or a combination of different algorithms. A neural network may also be used to train the system based on the received data. The ML module 134 may analyze the received data and/or information, and transform the data and/or information in a manner which provides enhanced operation of the vehicle 100, and particularly, the window glass system 162. The data and/or information may also be up-linked to other operational systems, subsystems, modules, and components of the vehicle 100 for further processing to discover additional information that may be used to enhance the understanding of the information.

As set forth, described, or illustrated herein, machine learning means computers and/or systems having an ability to learn without being explicitly programmed. Machine learning algorithms may be used to train one or more machine learning models of the vehicle 100 based on captured image data relating to one or more images of a vehicle passenger cabin, captured biometric attribute data relating to one or more biometric attributes of a driver of the vehicle, and captured light intensity data relating to an amount of light that enters the vehicle passenger cabin from the ambient environment via the one or more of the processors 120 of the control module/ECU 110, one or more data stores 135, the I/O hub 140, the sensor module 150, the vehicle system(s) 160, and any other input sources. The ML algorithms may include one or more of a linear regression algorithm, a logical regression algorithm, or a combination of different algorithms. A neural network may also be used to train the system based on the received data. The ML module 134 may analyze the received information or data in order to enhance one or more of the eye tracking module 132, the window glass cleaning module 133, the sensor module 150, and the vehicle systems 160. In one or more example embodiments, such a neural network may include, but is not limited to, a YOLO neural network.

In accordance with one or more embodiments set forth, described, and/or illustrated herein, the ML module 134 may also receive data and information from one or more other vehicles and process the received information to dynamically determine patterns in the ambient environment. Information may be received based on preferences including location (e.g., as defined by geography from address, zip code, or GPS coordinates), planned travel routes (e.g., GPS alerts), activity associated with co-owned/shared vehicles, history, news feeds, and the like. The information (i.e., received or processed information) may also be uplinked to other operational systems, subsystems, modules, and components of the vehicle 100 for further processing to discover additional information that may be used to enhance the understanding of the information. The ML module 134 may also transmit information to other vehicles, and link to other electronic devices, including but not limited to smart phones, smart home systems, or Internet-of-Things (IoT) devices. The ML module 134 may thereby communicate with/to other vehicles and or persons.

In accordance with one or more embodiments set forth, described, and/or illustrated herein, the ML module 134 may comprise one or more processors, and one or more data stores (e.g., non-volatile memory/NVM and/or volatile memory) containing a set of instructions, which when executed by the one or more processors, cause the ML module 134 to receive information from one or more of other vehicles, the one or more processors 120, the one or more data stores 135, the sensor module 150, the vehicle system(s) 160, and any other input/output sources, and process the received information to, inter alia, cause implementation of a window glass sequence of one or more movable vehicle window glass 161*a* of the vehicle 100. Embodiments, however, are not limited thereto, and thus, the ML module 134 may process the received data and information to do other aspects related to operation of the vehicle 100. The ML module 134 may communicate with and collect data and information from one or more of other vehicles, the one or more processors 120, the one or more data stores 135, the sensor module 150, the vehicle system (s) 160, and any other input/output sources to provide a deeper understanding of the monitored activities of the systems, components, and interfaces.

The one or more data stores 135 are configured to store one or more types of data. The vehicle 100 may include interfaces that enable one or more systems thereof to manage, retrieve, modify, add, or delete, the data stored in the data stores 135. The one or more data stores 135 may comprise volatile and/or non-volatile memory. Examples of suitable data stores 135 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The one or more data stores 135 may be a component of the one or more processors 120, or alternatively, may be operatively connected to the one or more processors 120 for use thereby. As set forth, described, and/or illustrated herein, "operatively connected" may include direct or indirect connections, including connections without direct physical contact.

The I/O hub 140 may be operatively connected to other systems, subsystems, and components of the vehicle 100. The I/O hub 140 may comprise an input interface and an output interface. The input interface and the output interface may be integrated as a single, unitary interface, or alternatively, be separate as independent interfaces that are operatively connected.

In accordance with one or more embodiments set forth, described, and/or illustrated herein, the input interface may be used by a user, such as, for example, a user, operator (including remote operator), or driver of the vehicle 100, to input settings related to a driver settings input signal 205 (See FIG. 3) to be stored in the one or more data stores 135 and/or accessible by the non-transitory memory 130.

The input interface is defined herein as any device, component, system, subsystem, element, or arrangement or groups thereof that enable information/data to be entered in a machine. The input interface may receive an input from the user, operator, or driver of the vehicle 100. In accordance with one or more example embodiments, the input interface may comprise a user interface (UI), graphical user interface (GUI) such as, for example, a display, human-machine interface (HMI), or the like. Embodiments, however, are not limited thereto, and thus, this disclosure contemplates the input interface comprising any suitable configuration that falls within the spirit and scope of the principles of this disclosure and which facilitates or otherwise contributes to an optimization or transformation of the performance and functionality of the one or more embodiments. For example, the input interface may comprise a keypad, toggle switch, touch screen, multi-touch screen, button, joystick, mouse, trackball, microphone and/or combinations thereof.

The output interface is defined herein as any device, component, system, subsystem, element, or arrangement or groups thereof that enable information/data to be presented to the vehicle driver and/or a remote operator of the vehicle 100. The output interface may be operable to present information/data to the vehicle occupant and/or the remote operator. The output interface may comprise one or more of a visual display or an audio display such as a microphone, earphone, and/or speaker. One or more components of the vehicle 100 may serve as both a component of the input interface and a component of the output interface.

The sensor module 150 is operable, at least during operation of the vehicle 100, to dynamically detect, determine, assess, monitor, measure, quantify, and/or sense information about the vehicle 100 and an ambient or external environment of the vehicle 100. As set forth, described, and/or illustrated herein, "sensor" means any device, component and/or system that can perform one or more of detecting, determining, assessing, monitoring, measuring, quantifying, and sensing something. The one or more sensors may be configured to detect, determine, assess, monitor, measure, quantify and/or sense in real-time. As set forth, described, and/or illustrated herein, "real-time" means a level of processing responsiveness that a user or system senses as sufficiently immediate for a particular process or determination to be made, or that enables the processor to keep up with some external process.

The sensor module 150 may comprise for example, one or more sensors operable to detect, determine, assess, monitor, measure, quantify, and/or sense objects in the ambient environment of the vehicle 100. The sensors include, but not limited to one or more photo sensors 151, one or more motion sensors 152, one or more cameras 153 (e.g., red, green, blue/RGB camera, multi-spectral infrared/IR camera), and one or more weight sensors 154 provided in the seats of the vehicle 100. Embodiments, however, are not limited thereto, and thus, this disclosure contemplates the implementation of any suitable sensor architecture that falls within the spirit and scope of the principles of this disclosure and which facilitates or otherwise contributes to an optimization or transformation of the performance and functionality of the one or more embodiments.

The one or more sensors may be operatively connected to the control module/ECU 110, the one or more data stores 135, and/or other elements, components, systems, subsystems, and modules of the vehicle 100. The sensor module 150 and/or any of the one or more sensors described herein may be provided or otherwise positioned in any suitable location with respect to the vehicle 100. For example, one or more of one or more sensors may be located within the cabin of the vehicle 100, one or more of the sensors may be located on the exterior of the vehicle 100, and/or one or more of the sensors may be located within a component of the vehicle 100. This disclosure contemplates arranging the one or more sensors in any suitable that permits practice of the one or more embodiments.

In accordance with one or more embodiments set forth, described, and/or illustrated herein, the one or more sensors may work independently from each other, or alternatively, may work in combination with each other. The sensors may be used in any combination, and may be used redundantly to validate and improve the accuracy of the detection.

In accordance with one or more embodiments set forth, described, and/or illustrated herein, the one or more photo sensors 151 may be configured to detect, determine, assess, monitor, measure, quantify, and/or sense, as light intensity data, an intensity of natural light/ambient light entering the passenger cabin through each movable vehicle window glass 161*a* supported by support panels. In accordance with one or more embodiments, to generate high-quality reading, the one or more photo sensors 151 are operable to detect natural/ambient light at a predetermined band wavelength, and reject all other wavelengths outside of this predetermined band wavelength. The one or more photo sensors 151 are operable to differentiate between various levels of light intensity, including, but not limited to a differentiation between daytime and nighttime conditions. As used herein, the term "daytime conditions" is to mean any set of lighting conditions which are not nighttime conditions, and the term "nighttime conditions" is to mean any set of lighting conditions which are representative of a light level any time of the day in which the amount of light entering the vehicle from outside is less than a predetermined level. Nonlimiting examples of "nighttime conditions" may include early evening or dusk, and darkness caused by storms during the daytime and the like. In accordance with one or more embodiments set forth, described, and/or illustrated herein, the appropriate conditions can be predetermined as input settings selected by the driver and stored in the one or more data stores 135.

In accordance with one or more embodiments set forth, described, and/or illustrated herein, the one or more motion sensors 152 may be configured to detect, determine, assess, monitor, measure, quantify, and/or sense, as image data, movement by the driver and/or passengers in the passenger cabin of the vehicle 100. For example, the one or more motion sensors 152 are operable to detect, determine, assess, monitor, measure, quantify, and/or sense movement (or orientation) of the head and eyes of the driver or operator of the vehicle in order to monitor and/or assess driver behavior. Should analysis of the sensor data suggest that the gaze of the driver or operator avoids fixation on a specific area of the vehicle window glass (e.g., the sensor data may show a "donut" like heatmap, where the middle of the donut represents the specific area the driver or operator of the vehicle avoids fixation due to its opacity) or that the driver or operator must move their head in order to see the side-view mirror, e.g., it may indicate that those areas of the vehicle window glass are unclean.

In accordance with one or more embodiments set forth, described, and/or illustrated herein, the sensor module 150 may comprise one or more image devices such as, for example, one or more cameras 153. As set forth, described, and/or illustrated herein, "camera" means any device, component, and/or system that can capture visual data. Such visual data may include one or more of video information/data and image information/data. The visual data may be in any suitable form. The one or more cameras 153 may be configured to detect, determine, assess, monitor, measure, quantify, and/or sense, as image data, one or more biometric attributes including, but not limited to one or more ocular characteristics of the driver and an orientation of a head of the driver of the vehicle 100 relative to a reference orientation. The one or more cameras 153 may comprise high resolution cameras. The high resolution can refer to the pixel resolution, the spatial resolution, spectral resolution, temporal resolution, and/or radiometric resolution.

In accordance with one or more embodiments set forth, described, and/or illustrated herein, the one or more cameras 153 may comprise high dynamic range (HDR) cameras or infrared (IR) cameras. One or more of the cameras 153 may comprise a lens and an image capture element. The image capture element may be any suitable type of image capturing device or system, including, for example, an area array sensor, a charge coupled device (CCD) sensor, a complementary metal oxide semiconductor (CMOS) sensor, a linear array sensor, and/or a CCD (monochrome). The image capture element may capture images in any suitable wavelength on the electromagnetic spectrum. The image capture element may capture color images and/or grayscale images. The one or more of the cameras 153 may be configured with zoom in and/or zoom out capabilities. The one or more cameras 153 may be spatially oriented, positioned, configured, operable, and/or arranged to capture visual data from inside the passenger cabin of the vehicle 100. For instance, one or more of the cameras 153 may be located within the passenger cabin of the vehicle 100.

In accordance with one or more embodiments set forth, described, and/or illustrated herein, the one or more cameras 153 may be fixed in a position that does not change relative to the vehicle 100. Alternatively or additionally, one or more of the cameras 153 may be movable so that its position can change relative to the vehicle 100 in a manner which facilitates the capture of visual data from different portions of the ambient environment of the vehicle 100. Such movement of the one or more cameras 153 may be achieved in any suitable manner, such as, for example, by rotation (about one or more rotational axes), by pivoting (about a pivot axis), by sliding (along an axis), and/or by extending (along an axis). The one or more cameras 153 (and/or the movement thereof) may be controlled by one or more of the control module/ECU 110, the eye tracking module 132, the window glass cleaning module 133, the sensor module 150, and any one or more of the modules, systems, and subsystems set forth, described, and/or illustrated herein.

In accordance with one or more embodiments set forth, described, and/or illustrated herein, the sensor module 150 may comprise one or more weight sensors 154. The one or more weight sensors 154 are operable to dynamically detect, determine, assess, monitor, measure, quantify, and/or sense when one or more vehicle seats in the vehicle passenger cabin are occupied by detecting a load applied to an external surface of a vehicle seat. The detected load is then output as an electric signal to the control module/ECU 110, where it is then compared to a predetermined threshold weight value stored in the non-transitory memory 130 and/or one or more data stores 135 for purposes of conducting or executing window glass cleanliness analysis to determine cleanliness of each movable vehicle window glass 161*a*. The one or more weight sensors 154 may be controlled by one or more of the control module/ECU 110, the eye tracking module 132, the window glass cleaning module 133, the sensor module 150, and any one or more of the modules, systems, and subsystems set forth, described, and/or illustrated herein.

In accordance with one or more embodiments set forth, described, and/or illustrated herein, the eye tracking module 132 may be implemented as computer readable program code that, when executed by the one or more processor(s) 120, implements one or more of the various processes set forth, described, and/or illustrated herein, including, to one or more of follow, observe, watch, and track one or more biometric attributes of the driver of the vehicle 100 over a plurality of sensor observations. The one or more biometric attributes can include, but are not limited to, ocular characteristics of the driver. The one or more ocular characteristics can include, but are not limited to, vertical palpebrae position and/or pupil dilation (detect change in pupil size) which corresponds to a need to initiate a cleaning sequence of one or more movable vehicle window glass 161*a* in the vehicle 100. In one or more embodiments, the eye tracking module 132 can track the eye movement of the eye(s) of the driver. As described herein, "sensor observation" means a moment of time or a period of time in which the one or more sensors of the sensor module 150 are used to acquire biometric attribute data of the driver, at least during operation of the vehicle 100.

The eye tracking module 132 may be a component of the control module/ECU 110, or alternatively, may be executed on and/or distributed among other processing systems to which the control module/ECU 110 is operatively connected. The eye tracking module 132 may comprise logic instructions executable by the control module/ECU 110. Alternatively or additionally, the one or more data stores 135 may contain such logic instructions. The logic instructions may include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.). The eye tracking module 132 set forth, described, and/or illustrated herein may include artificial or computational intelligence elements, e.g., neural network, fuzzy logic, or other machine learning algorithms.

In accordance with one or more embodiments set forth, described, and/or illustrated herein, the vehicle 100 may comprise one or more vehicle systems 160 and subsystems, such as, for example, a window system 161, a window glass cleaning system 162, and a vehicle component 163 that supports one or more vehicle window glass 161*a* (e.g., a vehicle door, a vehicle roof, a vehicle back wall, etc.). Embodiments, however, are not limited thereto, and thus, this disclosure contemplates the vehicle 100 comprising more, fewer, or different systems and subsystems. The control module/ECU 110 and the actuator(s) 170 are operatively connected to communicate with the various vehicle systems 160 and/or individual components thereof.

Figure 3:
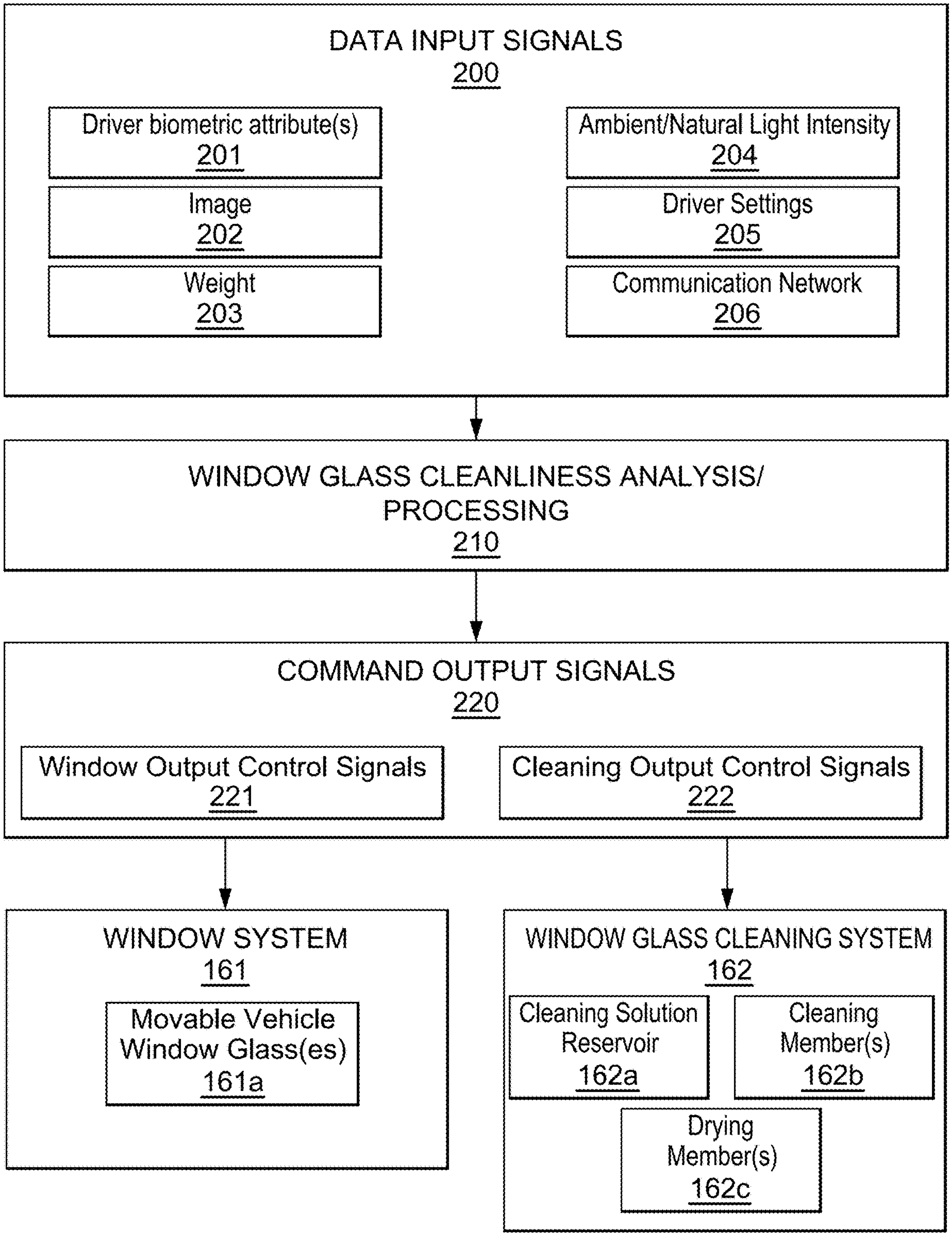
FIG. 3 illustrates a block diagram of one or more control blocks of the vehicle of FIG. 1.

As illustrated in FIG. 3, during operation of the vehicle 100, the computer-executable program code may instruct the one or more processors 120 to dynamically receive one or more data input signals 200 related to captured biometric attribute data 201 relating to one or more biometric attributes of the driver of the vehicle 100, captured image data 202 relating to one or more images of a passenger cabin of the vehicle 100, captured weight data 203 relating to when one or more vehicle seats in the vehicle passenger cabin are occupied, one or more images of a passenger cabin of the vehicle 100 and captured ambient/natural light intensity data relating to an amount of ambient/natural light that enters the vehicle passenger cabin through vehicle window glass 161*a*, data related to driver settings 205 stored in the one or more data store(s) 135, and wireless communication network data 206. The wireless communication network data includes, but is not limited to, GPS data, weather data, crowdsourced weather data, and vehicle-to-vehicle (V2V) communication data.

The computer-executable program code may instruct the one or more processors 120 to execute window glass cleanliness analysis 210 based on one or more of the following: the captured biometric attribute data 201, stored reference biometric attribute data, the captured visual image data 202, stored reference visual image data, the captured weight data 203, stored reference weight data, the captured ambient/natural light intensity data 204, stored reference ambient/natural light intensity data, the stored driver settings 205, and the wireless communication network data 206.

Executing the window glass cleanliness analysis 210 includes, but is not limited to, executing a comparison of the captured biometric attribute data 201 with the stored reference biometric attribute data, a comparison of the captured visual image data 202 with the stored reference visual image data, a comparison of the captured weight data 203 with the stored reference weight data, a comparison of the captured ambient/natural light intensity data 204 with stored reference ambient/natural light intensity data, and evaluation of the stored driver settings 205 and the wireless communication network data 206.

Based on the window glass cleanliness analysis 210, the computer-executable program code may instruct the one or more processors 120 to determine cleanliness of vehicle window glass based on the window glass cleanliness analysis 210.

Command output signals 220 include window output control signals 221 and cleaning output control signals 222. The computer-executable program code may instruct the one or more processors 120 to cause, when it is determined that one or more of the vehicle window glasses 161*a* is unclean, execution of a cleaning sequence via the window glass cleaning module 133. The cleaning may commence or otherwise be initiated by transmitting one or more cleaning output control signals 222 to one or more of the window glass cleaning system 162 and the actuator(s) 170*a* to cause the cleaning solution reservoir 162*a* to lubricate (e.g., wet) the one or more cleaning members 162*b*.

In response to the lubrication (e.g., wetting) of the one or more cleaning members, i.e., temporally after lubricating (e.g., wetting) the one or more cleaning members 162*b*, the computer-executable program code may instruct the one or more processors 120 to transmit one or more cleaning output control signals 222 to one or more of the window glass cleaning system 162 and the actuator(s) 170*a* to cause movement of the one or more cleaning members 162*b* to the deployed position. The computer-executable program code may also instruct the one or more processors 120 to transmit one or more window output control signals 221 to the one or more of the window system 161, the window glass cleaning system 162, and the actuator(s) 170*b* to cause movement of the vehicle window glass 161*a* in a (opening) direction towards the deployed one or more cleaning members 162*b* to engage and cause rotation of the one or more cleaning members 162*b* and thereby apply the cleaning solution on an interior surface and/or exterior surface of the vehicle window glass 161*a*. The control signals 221, 222 to deploy the one or more cleaning members 162*b* and move the vehicle window glass 161*a* in an opening direction may be transmitted simultaneously.

In response to the application of the cleaning solution on the interior surface and/or the exterior surface of the vehicle window glass 161*a*, the computer-executable program code may instruct the one or more processors 120 to transmit one or more cleaning output control signals 222 to one or more of the window glass cleaning system 162 and the actuator(s) 170*a* to cause movement of the one or more cleaning members 162*b* to the stowed position and the one or more drying members 162*c* to the deployed position. The computer-executable program code may also instruct the one or more processors 120 to transmit one or more window output control signals 221 to one or more of the window system 161, the window glass cleaning system 162, and the actuator (s) 170*b* to cause movement of the vehicle window glass 161*a* in a closing direction to engage the one or more drying members 162*c* and thereby dry the interior surface and/or the exterior surface of the vehicle window glass 161*a*. The control signals 221, 222 to stow the one or more cleaning members 162*b*, deploy the one or more drying members 162*c*, and move the vehicle window glass 161*a* in the closing direction may be transmitted simultaneously.

In accordance with one or more embodiments set forth, described, and/or illustrated herein, the computer-executable program code may instruct the one or more processors 120 to simultaneously cause a cleaning sequence of each movable vehicle window glass 161*a* determined to be unclean.

Figure 4:
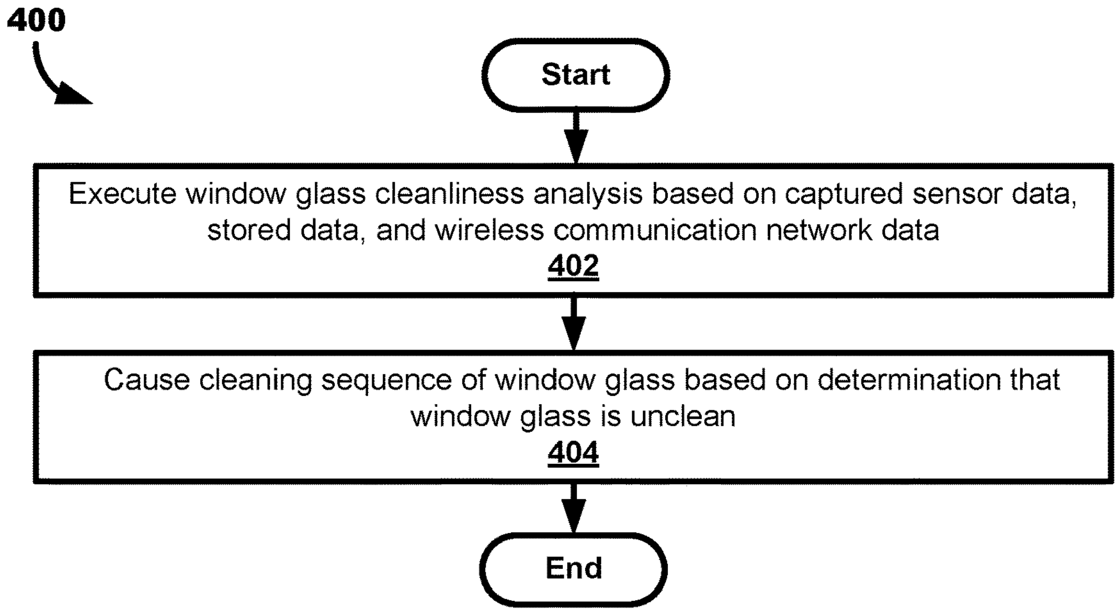
FIGS. 4 and 5 respectively illustrate a flowchart of one or more example computer-implemented methods of operating the vehicle of FIG. 1.
Figure 5:
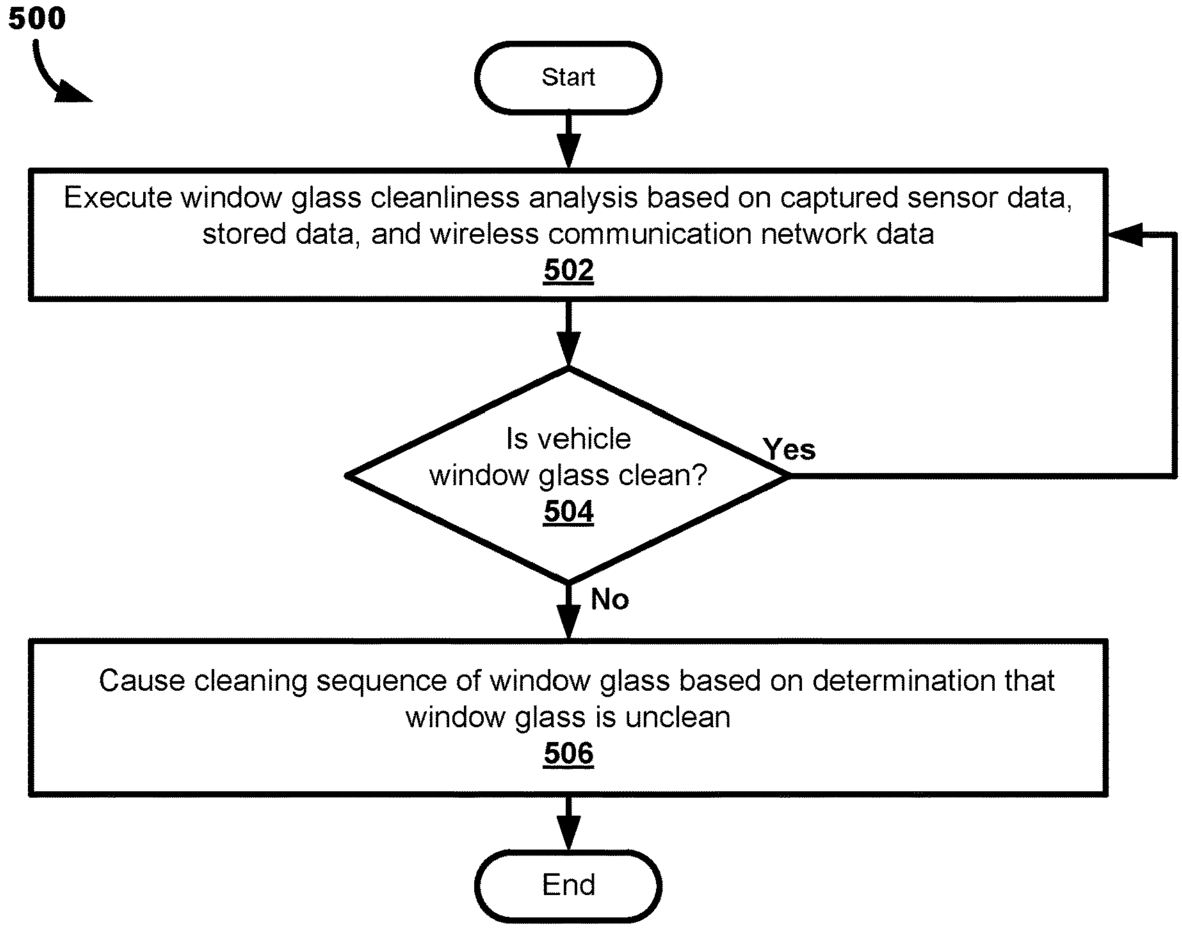

Illustrated examples shown in FIGS. 4 and 5 set forth example computer-implemented methods 400 and 500 for operating a vehicle. The respective flowcharts of the example computer-implemented methods 400 and 500 may be implemented by the one or more processors 120 of the ECU/Control module 110. In particular, the example computer-implemented methods 400 and 500 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

In the example computer-implemented methods 400 and 500, software executed by the ECU/Control module 110 provides functionality described or illustrated herein. In particular, software executed by the one or more processors 120 of the ECU/Control module 110 is configured to perform one or more processing blocks of the example computer-implemented methods 400 and 500 set forth, described, and/or illustrated herein, or provides functionality set forth, described, and/or illustrated.

In the illustrated example embodiment of FIG. 4, illustrated process block 402 includes executing, by one or more processors of a computing device associated with a vehicle, window glass cleanliness analysis to determine cleanliness of vehicle window glass based on captured sensor data associated with a passenger cabin of the vehicle, stored data, and wireless communication network data.

In accordance with the illustrated process block 402, the captured sensor data comprises one or more of image data relating to one or more images of the passenger cabin, captured biometric attribute data relating to one or more biometric attributes of a driver of the vehicle, and captured light intensity data relating to an amount of ambient/natural light that enters the passenger cabin through the vehicle window glass.

The computer-implemented method 400 may then proceed to illustrated process block 404, which includes causing, by the one or more processors based on the window glass cleanliness analysis and a determination that the vehicle window glass is unclean, a cleaning sequence of the vehicle window glass.

In accordance with the illustrated process block 404, causing the cleaning sequence comprises moving a porous cleaning head to a deployed position.

In accordance with the illustrated process block 404, causing the cleaning sequence comprises moving vehicle window glass in a first direction to engage and cause rotation of the porous cleaning head and thereby apply a cleaning solution on at least one surface of the vehicle window glass.

In accordance with the illustrated process block 404, causing the cleaning sequence comprises causing the cleaning sequence comprises moving the porous cleaning head to a stowed position and a drying member to a deployed position in response to applying the cleaning solution on at least one surface.

In accordance with the illustrated process block 404, causing the cleaning sequence comprises moving the vehicle window glass, in response to applying the cleaning solution on the interior surface, in a second direction opposite to the first direction to engage the drying member and thereby dry the at least one surface.

The computer-implemented method 400 can terminate or end after execution of illustrated process block 404.

In the illustrated example embodiment of FIG. 5, illustrated process block 502 includes executing, by one or more processors of a computing device associated with a vehicle, window glass cleanliness analysis to determine cleanliness of vehicle window glass based on captured sensor data associated with a passenger cabin of the vehicle, stored data, and wireless communication network data.

In accordance with the illustrated process block 502, the captured sensor data comprises one or more of image data relating to one or more images of the passenger cabin, captured biometric attribute data relating to one or more biometric attributes of a driver of the vehicle, and captured light intensity data relating to an amount of ambient/natural light that enters the passenger cabin through the vehicle window glass.

The computer-implemented method 500 may then proceed to illustrated decision block 504, which includes determining whether the vehicle window glass is clean based on executing a comparison of the captured sensor data to predetermined threshold values to determine the cleanliness.

If "Yes," i.e., should the comparison conclude the vehicle window glass is clean, the computer-implemented method 500 return to process block 502.

If "No," i.e., should the comparison conclude the vehicle window glass is unclean, the computer-implemented method 500 then proceeds to process block 506, which includes which includes causing, by the one or more processors based on the window glass cleanliness analysis and a determination that the vehicle window glass is unclean, a cleaning sequence of the vehicle window glass.

In accordance with the illustrated process block 506, causing the cleaning sequence comprises moving a porous cleaning head to a deployed position.

In accordance with the illustrated process block 506, causing the cleaning sequence comprises moving vehicle window glass in a first direction to engage and cause rotation of the porous cleaning head and thereby apply a cleaning solution on at least one surface of the vehicle window glass.

In accordance with the illustrated process block 506, causing the cleaning sequence comprises causing the cleaning sequence comprises moving the porous cleaning head to a stowed position and a drying member to a deployed position in response to applying the cleaning solution on at least one surface.

In accordance with the illustrated process block 506, causing the cleaning sequence comprises moving the vehicle window glass, in response to applying the cleaning solution on the interior surface, in a second direction opposite to the first direction to engage the drying member and thereby dry the at least one surface.

The computer-implemented method 500 can terminate or end after execution of illustrated process block 506.

Figure 6:
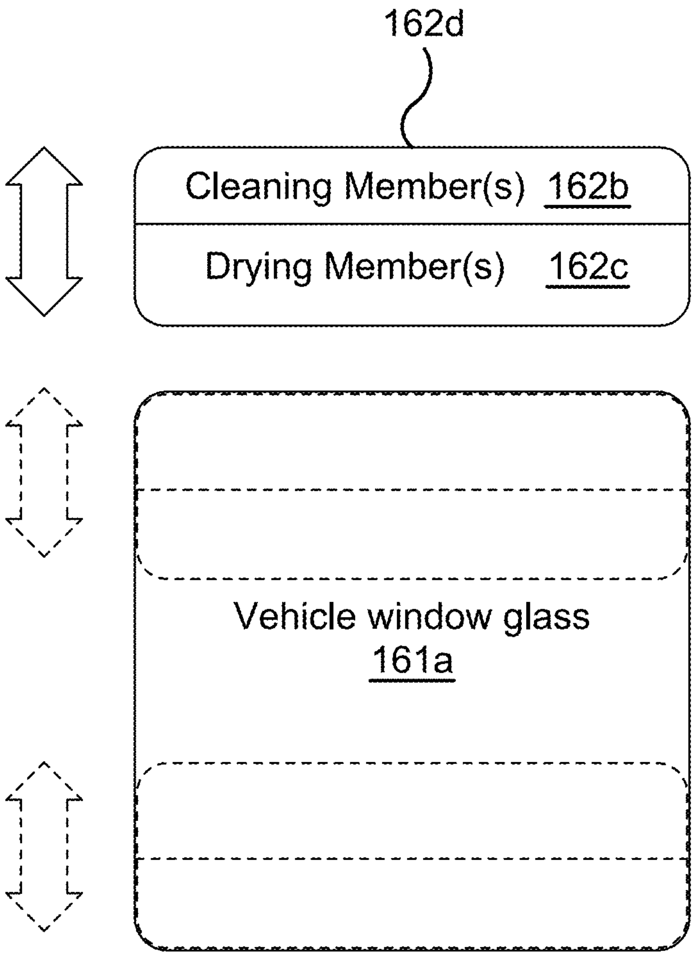
FIGS. 6 and 7 respectively illustrate a vehicle system that includes the window glass cleaning system and a vehicle window glass, in accordance with one or more embodiments shown and described herein.

In an illustrated example embodiment of FIG. 6, the computer-executable program code may instruct the one or more processors 120 to transmit one or more cleaning output control signals 222 to one or more of the window glass cleaning system 162 and the actuator(s) 170*a* to cause selective movement of the carrier 162*d* across a surface (interior and/or exterior) of the vehicle window glass 161*a* in order to execute a cleaning sequence. Movement of the carrier 162*d* in a cleaning direction of causes rotation of the one or more deployed cleaning members 162*b* by engagement with the surface of the vehicle window glass 161*a* in a manner which applies the cleaning solution thereon. Movement of the carrier 162*d* in a drying direction (a direction opposite to the cleaning direction) of the carrier 162*d* causes the deployed one or more drying members 162*c* to engage the surface of the vehicle window glass 161*a* to thereby dry the surface of the surface of the vehicle window glass 161*a*.

Figure 7:
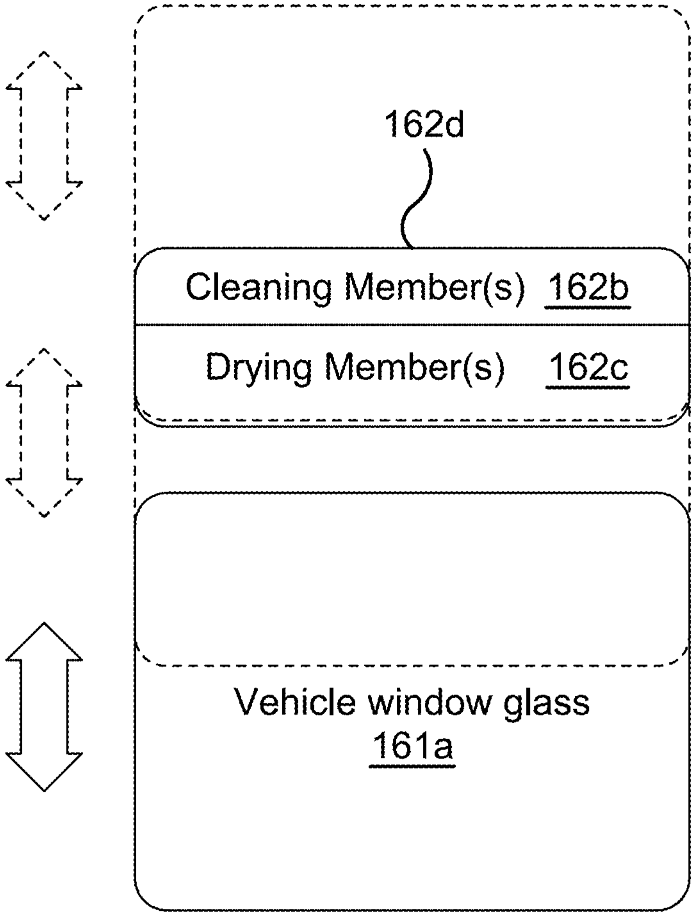

In an illustrated example embodiment of FIG. 7, the computer-executable program code may instruct the one or more processors 120 to transmit one or more window output control signals 221 to one or more of the window system 161 and the actuator(s) 170*b* to cause selective movement of the vehicle window glass 161*a* in order to execute a cleaning sequence. Movement of the vehicle window glass 161*a* in an open or cleaning direction causes engagement with the one or more deployed cleaning members 162*b* in a manner which applies the cleaning solution on a surface (interior and/or exterior) of the vehicle window glass 161*a*. Movement of the vehicle window glass 161*a* in a closing or drying direction (a direction opposite to the cleaning direction) causes engagement with the deployed one or more drying members 162*c* in a manner which dries the surface of the surface of the vehicle window glass 161*a*.

Figure 8:
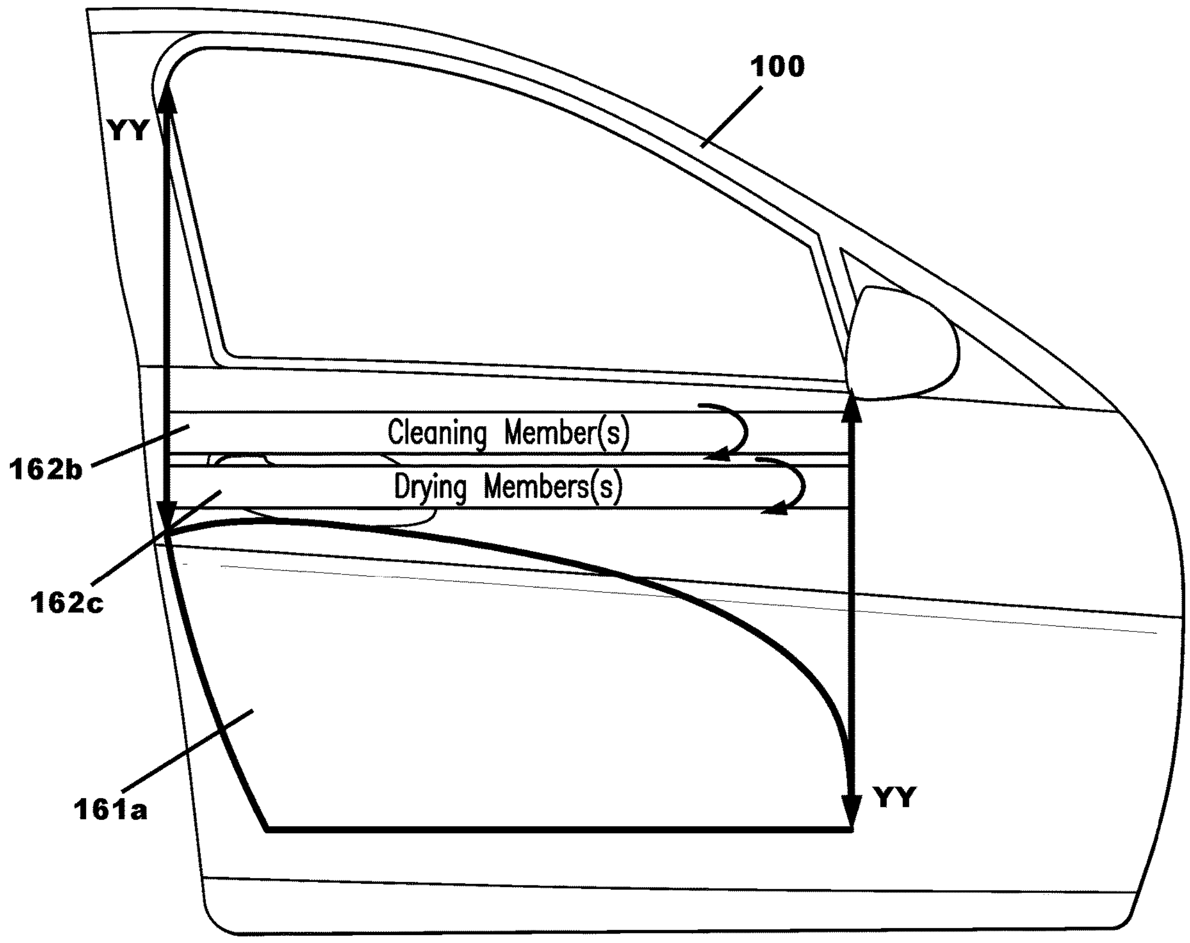
FIGS. 8 and 9 respectively illustrate implementation of the window glass cleaning system in a vehicle door, in accordance with one or more embodiments shown and described herein.
Figure 9:
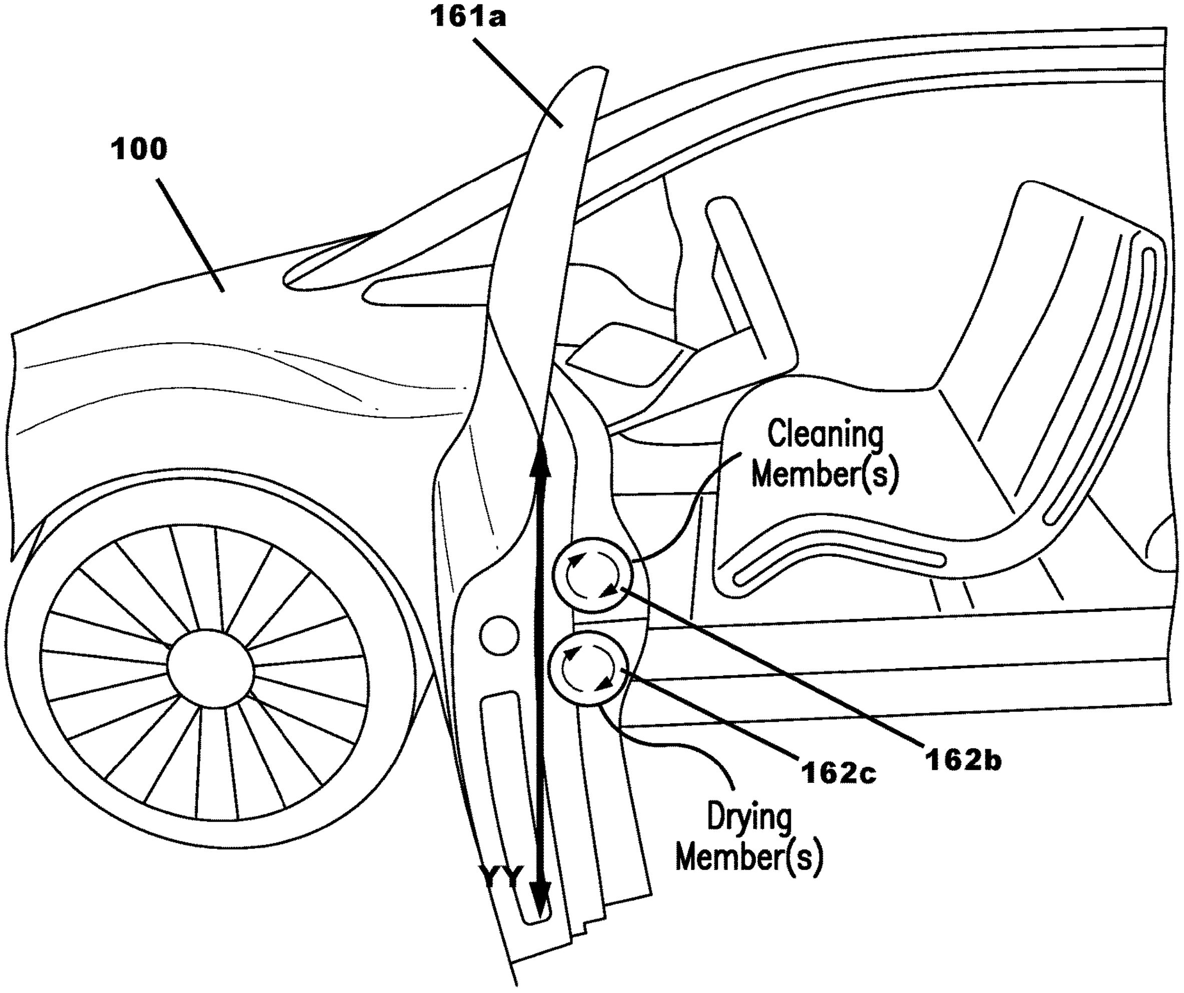

FIGS. 8 and 9 respectively illustrate the implementation of the window glass cleaning system in a vehicle door, in accordance with one or more embodiments shown and described herein. Movement of the vehicle window glass 161*a* in an open or cleaning direction (e.g., in a direction along an axis YY) causes engagement with the one or more deployed cleaning members 162*b* in a manner which applies the cleaning solution on a surface (interior and/or exterior) of the vehicle window glass 161*a*. Movement of the vehicle window glass 161*a* in a closing or drying direction that is opposite to the cleaning direction (e.g., in an opposite direction along an axis YY) causes engagement with the deployed one or more drying members 162*c* in a manner which dries the surface of the surface of the vehicle window glass 161*a*.

The terms "coupled," "attached," or "connected" may be used herein to refer to any type of relationship, direct or indirect, between the components in question, and may apply to electrical, mechanical, fluid, optical, electromagnetic, electro-mechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A vehicle, comprising:

one or more processors;

a non-transitory memory operatively coupled to the one or more processors comprising a set of instructions of computer-executable program code, which when executed by the one or more processors cause the vehicle to:

execute window glass cleanliness analysis to determine cleanliness of vehicle window glass based on captured sensor data associated with a passenger cabin of the vehicle, stored data, and wireless communication network data; and cause, based on the window glass cleanliness analysis and a determination that the vehicle window glass is unclean, a cleaning sequence of the vehicle window glass; and a window glass cleaning system arranged in an internal space defined by support panels that support the vehicle window glass, the window glass cleaning system including:

a cleaning solution reservoir to contain a cleaning solution;

one or more cleaning members in fluidic communication with the cleaning solution reservoir, the one or more cleaning members moveable between a first stowed position and a first deployed position to apply the cleaning solution to a surface of the vehicle window glass during the cleaning sequence; and a drying member, moveable between a second stowed position and a second deployed position to dry or remove the cleaning solution from the surface of the vehicle window glass during the cleaning sequence;

wherein the set of instructions are executable by the one or more processors to cause the cleaning sequence by:

moving the one or more cleaning members to the first deployed position, and moving the vehicle window glass in a first direction to engage the one or more cleaning members and thereby apply the cleaning solution on the surface of the vehicle window glass, wherein the one or more cleaning members remain in the first deployed position while the vehicle window glass is moved in the first direction.

2. The vehicle of claim 1, wherein the captured sensor data comprises one or more of image data relating to one or more images of the passenger cabin, captured biometric attribute data relating to one or more biometric attributes of a driver of the vehicle, and captured light intensity data relating to an amount of ambient or natural light that enters the passenger cabin through the vehicle window glass.

3. The vehicle of claim 2, wherein the one or more cleaning members comprise a porous cleaning head that is mounted for rotation about an axis, the porous cleaning head having a width that corresponds to the width of the vehicle window glass.

4. The vehicle of claim 3, wherein the set of instructions are executable by the one or more processors to cause the vehicle to cause, in response to the determination that the vehicle window glass is unclean, the cleaning solution reservoir to wet the one or more cleaning members.

5. The vehicle of claim 1, wherein the set of instructions are executable by the one or more processors to cause the cleaning sequence by:

moving the one or more cleaning members to the first stowed position and the drying member to the second deployed position in response to applying the cleaning solution on the surface of the vehicle window glass, and moving the vehicle window glass, in response to applying the cleaning solution on the surface of the vehicle window glass, in a second direction opposite to the first direction to engage the drying member and thereby dry the surface of the vehicle window glass, wherein the drying member remains in the second deployed position while the vehicle window glass is moved in the second direction.

6. A computer program product comprising at least one non-transitory computer readable medium having a set of instructions of computer-executable program code, which when executed by one or more processors of a computing device, cause the computing device to:

execute window glass cleanliness analysis to determine cleanliness of vehicle window glass based on captured sensor data associated with a passenger cabin of a vehicle, stored data, and wireless communication network data; and cause, based on the window glass cleanliness analysis and a determination that the vehicle window glass is unclean, a cleaning sequence of the vehicle window glass;

wherein the vehicle window glass is situated proximate to a window glass cleaning system, the window glass cleaning system arranged in an internal space defined by support panels that support the vehicle window glass, the window glass cleaning system including:

a cleaning solution reservoir to contain a cleaning solution;

one or more cleaning members in fluidic communication with the cleaning solution reservoir, the one or more cleaning members moveable between a first stowed position and a first deployed position to apply the cleaning solution to a surface of the vehicle window glass during the cleaning sequence; and a drying member, moveable between a second stowed position and a second deployed position to dry or remove the cleaning solution from the surface of the vehicle window glass during the cleaning sequence;

wherein the set of instructions are executable by the one or more processors to cause the cleaning sequence by:

moving the one or more cleaning members to the first deployed position, and moving the vehicle window glass in a first direction to engage the one or more cleaning members and thereby apply the cleaning solution on the surface of the vehicle window glass, wherein the one or more cleaning members remain in the first deployed position while the vehicle window glass is moved in the first direction.

7. The computer program product of claim 6, wherein the captured sensor data comprises one or more of image data relating to one or more images of the passenger cabin, captured biometric attribute data relating to one or more biometric attributes of a driver of the vehicle, and captured light intensity data relating to an amount of ambient or natural light that enters the passenger cabin through the vehicle window glass.

8. The computer program product of claim 7, wherein the one or more cleaning members comprise a porous cleaning head that is mounted for rotation about an axis, the porous cleaning head having a width that corresponds to the width of the vehicle window glass.

9. The computer program product of claim 8, wherein the set of instructions are executable by the one or more processors to cause the computing device to cause, in response to the determination that the vehicle window glass is unclean, the cleaning solution reservoir to wet the one or more cleaning members.

10. The computer program product of claim 6, wherein the set of instructions are executable by the one or more processors to cause the computing device to initiate the cleaning sequence by:

moving the one or more cleaning members to the first stowed position and the drying member to the second deployed position in response to applying the cleaning solution on the surface of the vehicle window glass, and moving the vehicle window glass, in response to applying the cleaning solution on the surface of the vehicle window glass, in a second direction opposite the first direction to engage the drying member and thereby dry the surface of the vehicle window glass, wherein the drying member remains in the second deployed position while the vehicle window glass is moved in the second direction.

11. A computer-implemented method, comprising:

executing, by one or more processors of a computing device associated with a vehicle, window glass cleanliness analysis to determine cleanliness of vehicle window glass based on captured sensor data associated with a passenger cabin of the vehicle, stored data, and wireless communication network data; and causing, by the one or more processors based on the window glass cleanliness analysis and a determination that the vehicle window glass is unclean, a cleaning sequence of the vehicle window glass;

wherein the vehicle window glass is situated proximate to a window glass cleaning system, the window glass cleaning system arranged in an internal space defined by support panels that support the vehicle window glass, the window glass cleaning system including:

a cleaning solution reservoir containing a cleaning solution;

one or more cleaning members in fluidic communication with the cleaning solution reservoir, the one or more cleaning members moveable between a first stowed position and a first deployed position to apply the cleaning solution to a surface of the vehicle window glass during the cleaning sequence; and a drying member, moveable between a second stowed position and a second deployed position to dry or remove the cleaning solution from the surface of the vehicle window glass during the cleaning sequence;

wherein causing the cleaning sequence comprises:

moving the one or more cleaning members to the first deployed position, and moving the vehicle window glass in a first direction to engage the one or more cleaning members and thereby apply the cleaning solution on the surface of the vehicle window glass, wherein the one or more cleaning members remain in the first deployed position while the vehicle window glass is moved in the first direction.

12. The computer-implemented method of claim 11, wherein the captured sensor data comprises one or more of image data relating to one or more images of the passenger cabin, captured biometric attribute data relating to one or more biometric attributes of a driver of the vehicle, and captured light intensity data relating to an amount of ambient or natural light that enters the passenger cabin through the vehicle window glass.

13. The computer-implemented method of claim 11, wherein causing the cleaning sequence comprises moving the one or more cleaning members to the first stowed position and a drying member to the second deployed position in response to applying the cleaning solution on the surface of the vehicle window glass.

14. The computer-implemented method of claim 13, wherein causing the cleaning sequence comprises moving the vehicle window glass, in response to applying the cleaning solution on the surface of the vehicle window glass, in a second direction opposite to the first direction to engage the drying member and thereby dry the surface of the vehicle window glass, wherein the drying member remains in the second deployed position while the vehicle window glass is moved in the second direction.

15. The vehicle of claim 2, wherein the biometric attributes include one or more ocular characteristics, and wherein the determination that the vehicle window glass is unclean is based on a detected change in pupil size.

16. The computer program product of claim 7, wherein the biometric attributes include one or more ocular characteristics, and wherein the determination that the vehicle window glass is unclean is based on a detected change in pupil size.

17. The computer-implemented method of claim 12, wherein the biometric attributes include one or more ocular characteristics, and wherein the determination that the vehicle window glass is unclean is based on a detected change in pupil size.

* * * * *